(12) United States Patent
Gertner et al.

(10) Patent No.: US 10,387,368 B2
(45) Date of Patent: *Aug. 20, 2019

(54) IDEAL AGE VECTOR BASED FILE RETENTION IN A SOFTWARE TESTING SYSTEM

(71) Applicant: International Business Machines Corporation, Armonk, NY (US)

(72) Inventors: Jeffrey M. Gertner, Endicott, NY (US); Timothy D. Greer, Endicott, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 177 days.

This patent is subject to a terminal disclaimer.

(21) Appl. No.: 14/921,208

(22) Filed: Oct. 23, 2015

(65) Prior Publication Data

US 2017/0116209 A1    Apr. 27, 2017

(51) Int. Cl.
G06F 16/11       (2019.01)
G06F 11/36       (2006.01)
G06F 16/16       (2019.01)
G06F 8/71        (2018.01)

(52) U.S. Cl.
CPC ........ G06F 16/125 (2019.01); G06F 11/3668 (2013.01); G06F 16/162 (2019.01); G06F 8/71 (2013.01)

(58) Field of Classification Search
CPC .. G06F 16/125; G06F 11/3668; G06F 16/162; G06F 8/71

USPC ......................................................... 717/122
See application file for complete search history.

(56) References Cited

U.S. PATENT DOCUMENTS

| 7,131,112 | B1 | 10/2006 | Bartz et al. |
| 7,437,722 | B2 | 10/2008 | Poole |
| 8,200,626 | B1* | 6/2012 | Katzer .............. G06F 17/30132 707/618 |
| 8,332,822 | B2 | 12/2012 | Nagappan et al. |
| 2003/0202703 | A1* | 10/2003 | Ogi ....................... G06T 7/0004 382/224 |

(Continued)

OTHER PUBLICATIONS

Jeffrey M. Gertner, et al.; "Ideal Age Vector Based File Retention in a Software Testing System"; U.S. Appl. No. 15/069,357, filed Mar. 14, 2016.

(Continued)

*Primary Examiner* — Emerson C Puente
*Assistant Examiner* — Sen Thong Chen
(74) *Attorney, Agent, or Firm* — Cantor Colburn LLP; Edward Wixted

(57) ABSTRACT

Embodiments relate to ideal age vector based file retention in a software testing system. An aspect includes determining an ideal age vector of historical bug age data corresponding to a software product in the software testing system, wherein the software testing system stores a plurality of version files of the software product. Another aspect includes based on receiving a new version file of the software product, determining a file to delete of the plurality of version files and the new version file based on the ideal age vector. Yet another aspect includes deleting the determined file to delete such that a number of remaining version files is equal to a number of the plurality of version files.

12 Claims, 4 Drawing Sheets

(56) References Cited

U.S. PATENT DOCUMENTS

| | | | |
|---|---|---|---|
| 2008/0047000 A1* | 2/2008 | Kanamaru | G06F 21/10 726/17 |
| 2008/0104470 A1* | 5/2008 | Benvenga | G06F 11/273 714/738 |
| 2014/0033176 A1* | 1/2014 | Rama | G06F 11/3688 717/124 |
| 2014/0282411 A1* | 9/2014 | Liemandt | G06F 11/3688 717/124 |
| 2014/0289704 A1* | 9/2014 | Viswanathan | G06F 8/71 717/123 |
| 2015/0131779 A1* | 5/2015 | Sugimoto | G01N 23/18 378/58 |
| 2016/0232075 A1* | 8/2016 | Lee | G06F 11/008 |
| 2017/0070692 A1* | 3/2017 | Lin | H04N 5/2176 |

OTHER PUBLICATIONS

List of IBM Patents or Patent Applications Treated as Related—Date Filed: Mar. 22, 2016; 1 page.

Greer, Timothy; "Method for Paring Archived Data to Allow for Smooth Depreciation"; IBM; Research Disclosure No. 441; p. 1-2; Jan. 2001.

Sharafat, Ali R., et al.; "A Probabilistic Approach to Predict Changes in Object-Oriented Software Systems"; 11th European Conference on Software Maintenance and Reengineering; p. 1-10; 2007.

Max, Joel; Quantizing for Minimum Distortion; IRE Transactions on Information Theory; p. 7-12; Mar. 1960.

* cited by examiner

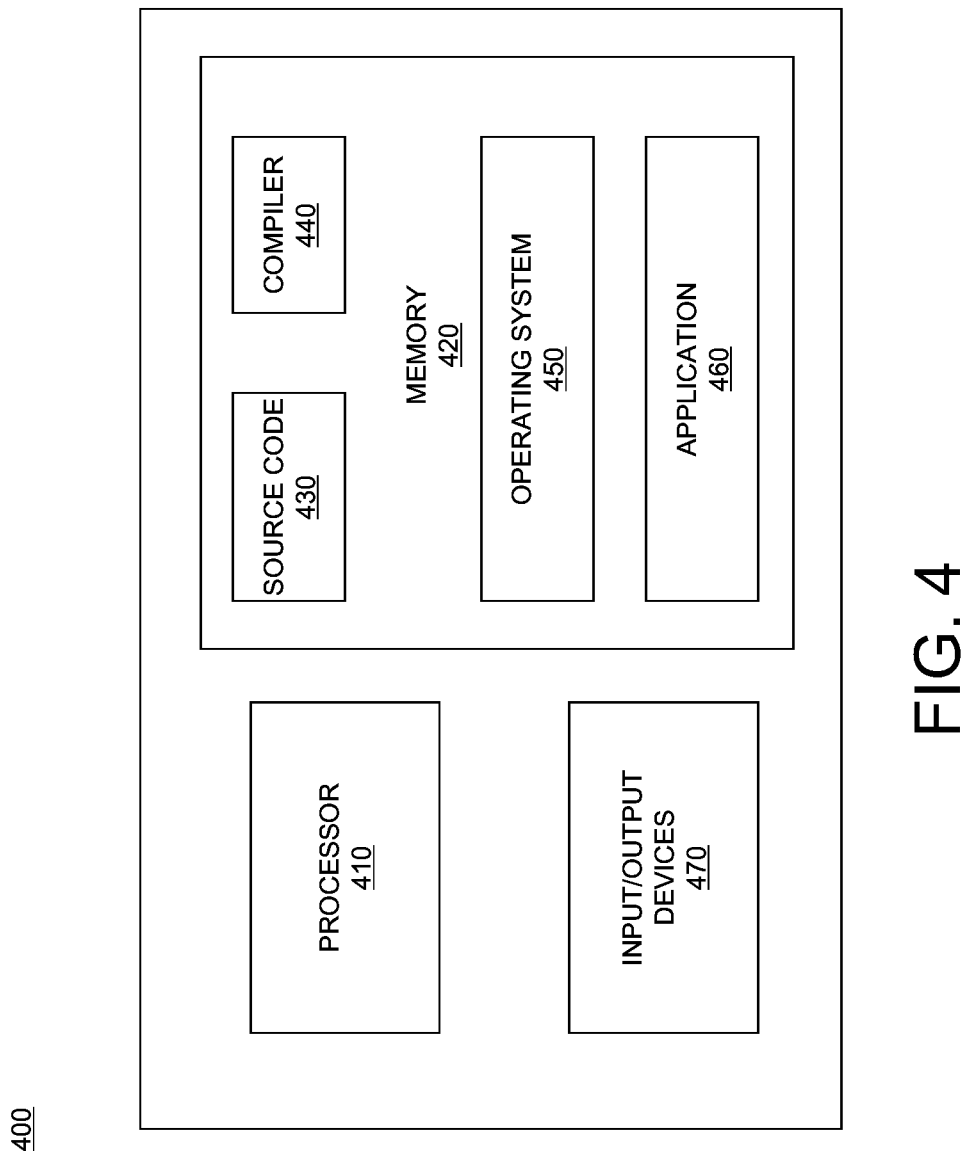

IDEAL AGE VECTOR BASED FILE RETENTION IN A SOFTWARE TESTING SYSTEM

BACKGROUND

The present invention relates generally to file retention in a software testing system, and more specifically, to ideal age vector based file retention in a software testing system.

Software may be extensively tested before being released as a software product. In a software testing environment, new versions of software under test are regularly provided to the testers as developers make changes to the software. The new versions may be provided at any appropriate interval, for example, daily. Each new version may take the form of a relatively large file. It is useful to retain historical version files of software under test because after a bug (or error) has been discovered in the software, the historical version files of the software may be used to determine when the bug was introduced into the software. Knowledge of when the bug was introduced may allow identification of the cause of the bug and reduce the necessary debugging effort to correct the bug. Retention of a relatively large number of historical version files may be necessary to pinpoint when bugs were introduced into software.

SUMMARY

Embodiments include a method, system, and computer program product for ideal age vector based file retention in a software testing system. An aspect includes determining an ideal age vector of historical bug age data corresponding to a software product in the software testing system, wherein the software testing system stores a plurality of version files of the software product. Another aspect includes based on receiving a new version file of the software product, determining a file to delete of the plurality of version files and the new version file based on the ideal age vector. Yet another aspect includes deleting the determined file to delete such that a number of remaining version files is equal to a number of the plurality of version files.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 4 depicts an example of a computer for use in conjunction with ideal age vector based file retention in a software testing system in accordance with an embodiment.

DETAILED DESCRIPTION

Figure 1:
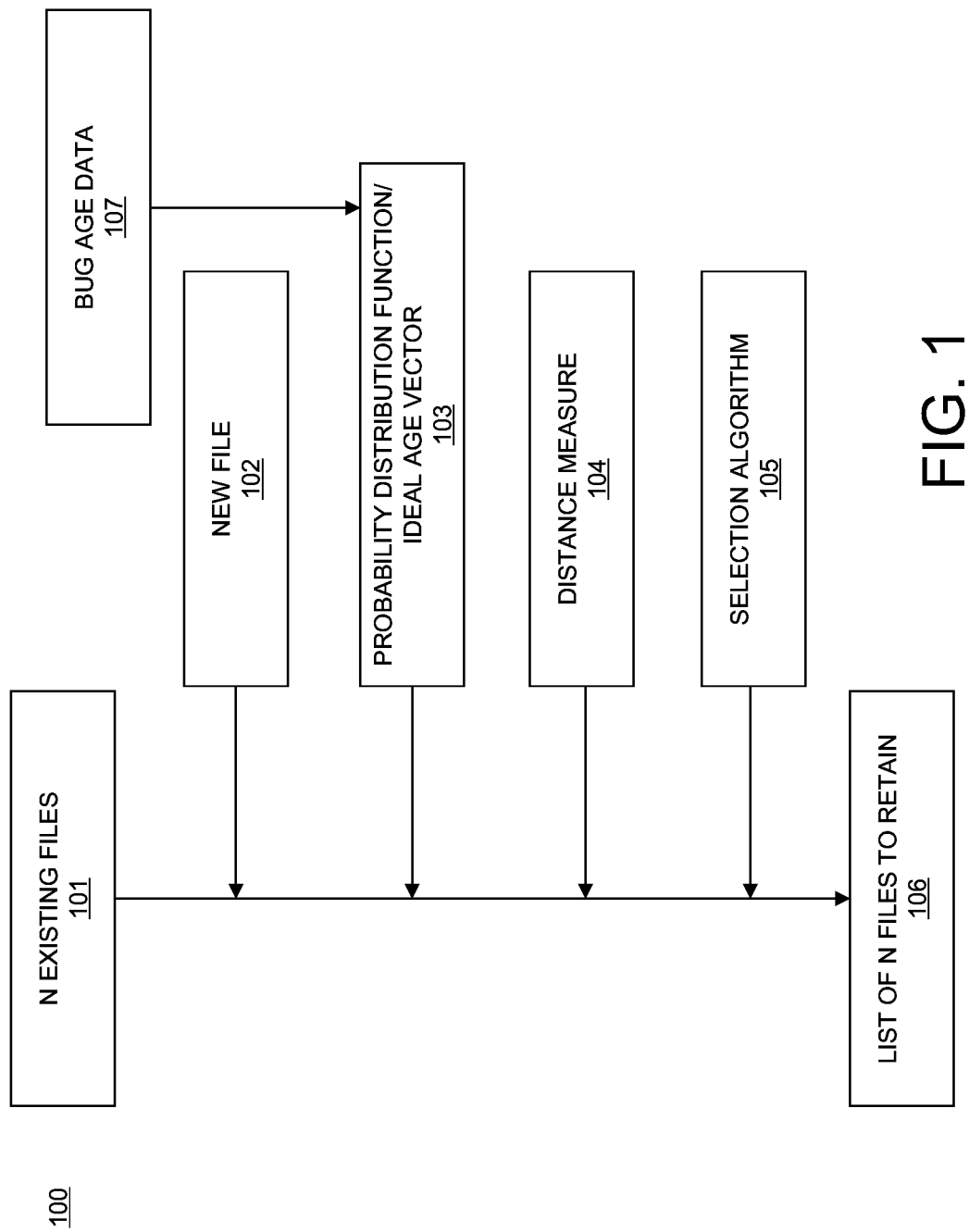
FIG. 1 depicts a system for ideal age vector based file retention in a software testing system in accordance with an embodiment.

Embodiments of ideal age vector based file retention in a software testing system are provided, with exemplary embodiments being discussed below in detail. The number of historical version files of a software product that are retained is limited by physical storage, especially in the case of a relatively large software product. Therefore, in general, when a new version file is received, an older file is selected for deletion in order to make space for the new file. However, some bugs may be present in the software for a relatively long period of time before they are identified; for example, not all tests are run daily, the results of tests that are run are not necessarily observed promptly, or a bug may not immediately be recognized as a bug. Ideal age vector based file retention is implemented to select the best file to delete upon receipt of a new file, so as to retain a set of historical version files that give a good probability of being able to determine bug origins. The ideal age vector may be determined based on a probability distribution function that is based on data regarding the amount of time bugs have historically been present in the software before discovery in the software testing system.

In the software testing system, the physical memory may have space for N files. When a new file becomes available, if fewer than N files are currently stored, the new file is stored with its age. If N files are already stored, then, when a new file is received, there are N+1 files. The N+1 files have a range of ages. At least one of the N+1 files must be selected for deletion in order to get down to the desired storage consumption, i.e., N files. Ideal age vector based file retention ensures that the N remaining files best enable the determination of when the bug was introduced. The age of a file may be literal chronological age in some embodiments, or in other embodiments may be a measure of code change, e.g. lines of code modified since some reference date. The ages of the N+1 files may be a strictly increasing function across the N+1 files, because if the code is unchanged there is no reason to send a new file to the software testing system. Once a file is deleted it cannot be recovered.

The probability distribution function represents the likelihood that a newly-detected bug is of a given age. Given the probability distribution function representing the likelihood that a newly-detected bug is of a given age, and the number N of files to retain of the N+1 files, an ideal age vector for the ages of the N retained files may be determined based on the probability distribution function. This ideal age vector will be the ages which partition the probability distribution function into N+1 regions of equal probability. In some embodiments, the ideal age vector may be directly specified instead of being determined by the probability distribution function, that is, the N desired ages that make up the ideal age vector may be specified. In various embodiments, the probability distribution function and associated ideal age vector may be updated with new bug age data as bugs are located and their ages identified by the software testing system.

A distance measure is defined (or programmatically determined) for comparing the ideal age vector to a vector of the same length consisting of a subset of actual ages of files. The distance measure is used to determine N of the N+1 files that best match the ideal age vector. In some embodiments, the distance measure between two age vectors may be the sum of the absolute values of the age differences of the individual components of each vector, where the individual components are ordered by age. For example, the absolute value of the difference between the oldest age in each vector, plus the absolute value of the difference between the next-oldest age in each vector, and so on down to the absolute value of the difference between the youngest age in each vector. In some embodiments, the distance between a vector and the ideal age vector might be a nearest neighbor distance, where the distance is the sum of the absolute values of the difference of each age within the ideal age vector and the nearest age component in the given vector. In some embodiments, the distance measure may be a Euclidean distance, e.g., the sum of the squares of the component-wise differences between individual components of the ideal age vector and the actual age vector (this particular distance being known as a squared Euclidean distance).

Various selection algorithms may be used to determine the set of N files of the N+1 files that best matches the ideal age vector based on the distance measures. In some embodiments, a greedy algorithm may be implemented. The greedy algorithm is an algorithm that always makes the choice that provides the largest immediate benefit. The greedy algorithm tests all of the N+1 choices for a file to delete, and for each choice calculates the distance measure between that choice (i.e., the age vector of the remaining files without the deletion candidate) and the ideal age vector. The greedy algorithm then selects the deletion candidate whose remaining files have the minimum distance measure.

As used herein, N is the number of files that can be retained at any given time, not counting the newly-arriving file. The ages of the N+1 files may be defined in various ways, for example, chronological age, changed lines of code prior to current date, or code fixes prior to current date. The probability distribution function is the likely distribution of the age of an error (i.e., a bug) that is being located in the historical files. A list of ideal ages (i.e., the ideal age vector) may be defined for the N files to retain based on the probability distribution function. The distance measure is the distance of a given age vector from the ideal age vector.

Turning now to FIG. 1, a system 100 for ideal age vector based file retention in a software testing system is generally shown. The system 100 stores N existing files 101 in a computer memory. The number N is dictated by the amount of available storage. The N existing files 101 are historical versions of the same software product, each having a different age. The N existing files 101 are used to determine the ages of bugs that are found by testing of the software product. When new file 102 arrives in system 100, a file of N existing files 101 must be deleted to make room for new file 102. New files, such as new file 102, may arrive at any time interval in various embodiments, and the time interval may be roughly constant or may vary between file arrivals in various embodiments. A probability distribution function and associated ideal age vector 103 are determined based on historical data 107 regarding bugs that have been identified in the software product by the software testing system. Probability distribution function and associated ideal age vector 103 may be updated during operation of system 100 as bugs are located and their ages are determined in the software testing system. In some embodiments, the ideal age vector may be directly determined without determining the probability distribution function. The ideal age vector may depend on the particular software product, but may be determined based on the probability distribution function p(x) of the age of a change (or bug) that is being located in the N files. In some embodiments, the ideal age vector may cover the age ranges uniformly.

When the new file 102 arrives, a set of distance measures 104 between the ideal age vector 103 and various file retention scenarios involving the N existing files 101 and the new file 102 are determined based on an algorithm 105. The distance measure 104 is based on the actual ages of the files that are retained based on a particular file being deleted, and is used to quantify how good or bad a particular age vector is, i.e., how close it is to the ideal age vector 103. The distance measure 104 may be determined based on, for example, an absolute value distance, a Euclidean distance, or nearest neighbor distance. The selection algorithm 105 determines which file retention scenarios are used to determined distance measures 104, and selects a particular file retention scenario (i.e., deletes a particular deletions candidate file) to give list 106 of N files to retain. The algorithm 105 may take into account that the algorithm is run for each new arrival, and may further take into account that a file that is deleted cannot be recovered in some embodiments. The N retained files 106 are then used to determine the time of introduction of a newly identified bug in the software product. Any bug ages determined using the N retained files 106 may be fed back into the probability distribution function/ideal age vector 103 as bug age data 107.

Figure 2:
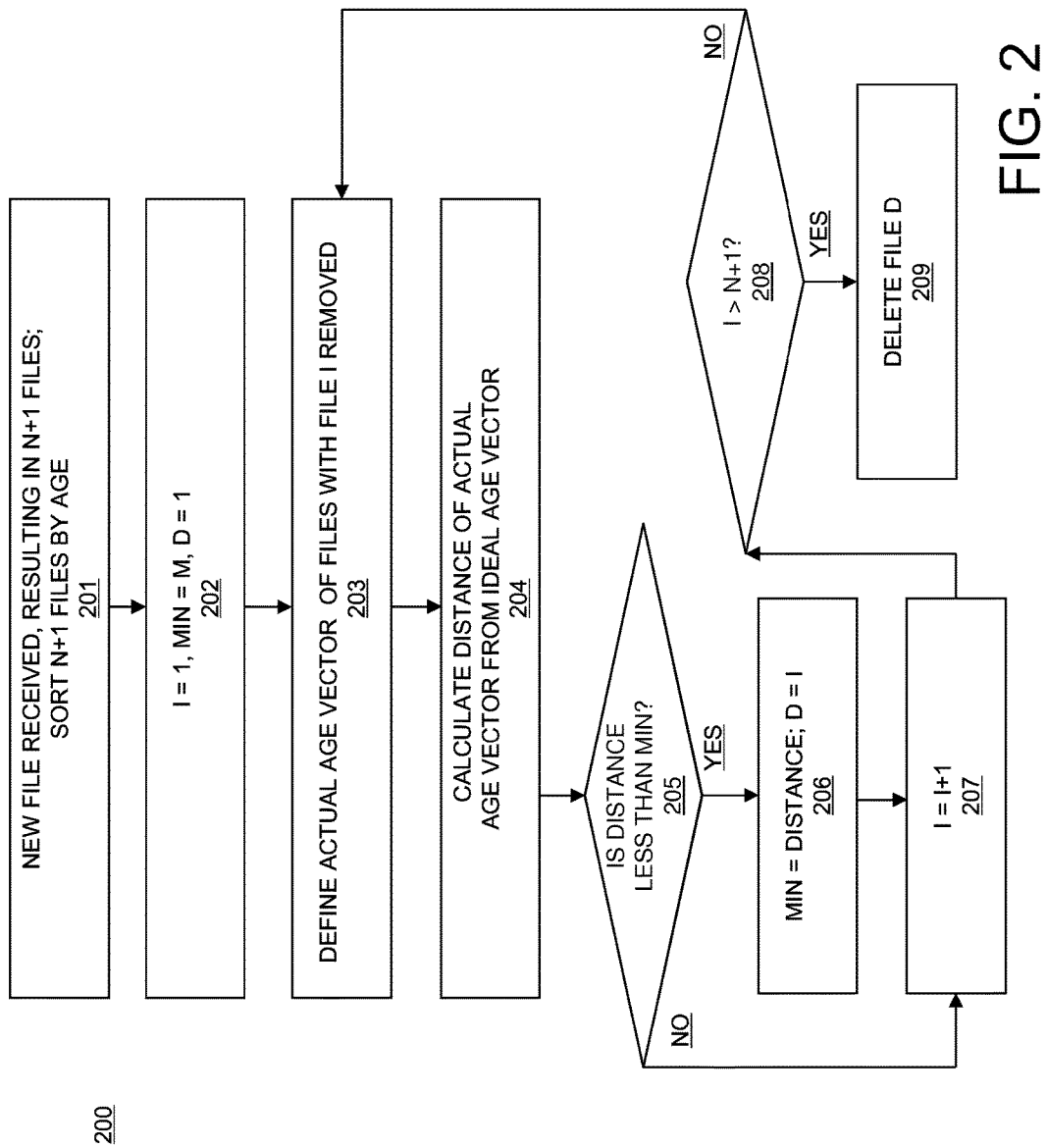
FIG. 2 depicts a process flow for ideal age vector based file retention in a software testing system in accordance with an embodiment.

FIG. 2 illustrates an embodiment of a method 200 for ideal age vector based file retention in a software testing system. Method 200 is executed in the software testing system whenever a new version file arrives that puts the number of version files at N+1, where N is the maximum number of version files. The embodiment of method 200 implements a greedy algorithm as algorithm 105 using a Euclidean distance measure as distance measure 104; however, this is shown for illustrative purposes only. Various algorithms that may be implemented in various embodiments of ideal age vector based file retention in a software testing system are discussed below with respect to Tables 1-4. In block 201, a new version file corresponding to a software product is received, resulting in N+1 files corresponding to the software product, such that 1 file of the N+1 files must be deleted. The N+1 files are sorted by age, and each file has a distinct age. In block 202, I is set to 1, Min is set to M, which may be any relatively large number, and D is set to 1. In block 203, the actual age vector of the ages of the files with file I removed (i.e., file I is being evaluated as a possible deletion candidate) is determined. In block 204, the distance measure (such as the distance measure 104 of FIG. 1) of the actual age vector that was determined in block 203 from the ideal age vector (such as ideal age vector 103 of FIG. 1) is determined. In block 205, it is determined whether the distance measure that was determined in block 204 is less than Min. If it is determined in block 205 that the distance measure that was determined in block 204 is less than Min, then flow proceeds to block 206, in which Min is set equal to the distance that was determined in block 204, and D is set equal to I, i.e., I is the current selected deletion candidate. Flow then proceeds to block 207. If it is determined in block 205 that the distance measure that was determined in block 204 is not less than Min, then flow proceeds directly from block 205 to block 207. In block 207, I is incremented by 1. Then, in block 208, it is determined whether the incremented I is greater than N+1. If it is determined in block 208 that I is not greater than N+1, then flow returns from block 208 to block 203. The actual age vector is determined for each possible deletion candidate by stepping through blocks 203, 204, 205, 206, and 207 for each of the N+1 files using I. The file I having the smallest distance measure is determined and saved as file D. When it is determined in block 208 that I is greater than N+1, then flow proceeds to block 209, in which file D is deleted.

In some embodiments in which the historical version files are of differing sizes, deletion of file D may not free up enough storage for the incoming version file. In such an embodiment, the method 200 is repeated with the set of files (i.e., the N+1 files without file D, which is a set of N files) to determine another file $D_2$ to delete. In such an embodiment, $N_2$, which is equal to N−1, is substituted for N, because the system only has storage for N−1 files. The method 200 may be repeated as needed until the remaining files fit in the available storage.

Figure 3:
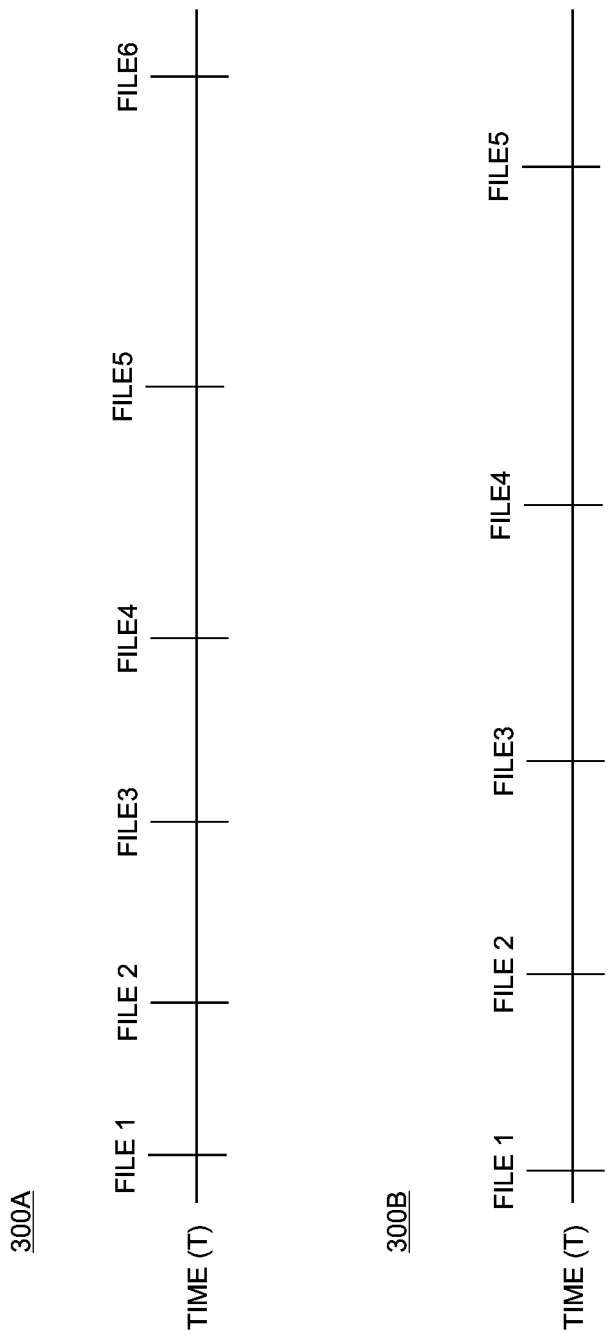
FIG. 3 illustrates an example of an actual age vector and an ideal age vector in accordance with an embodiment.

FIG. 3 illustrates an example of an actual age vector 300A of ages of N+1 files as compared to an ideal age vector 300B. Ideal age vector 300B may correspond to ideal age vector 103 of FIG. 1. As shown in the example of FIG. 3, N is equal to 5, such that one of files 1-6 must be deleted. A file of files 1-6 must be selected for deletion such that the remaining files best match the ideal age vector 300B. Various selection algorithms may be used for algorithm 105 of FIG. 1 to determine the best deletion candidate in various embodiments. Some examples of such algorithms are illustrated in Tables 1-4 below. In the algorithms of Tables 1-4, X is the file that is chosen for elimination, alist(i) represents the ideal age vector of N ages for the retained files, and nowlist(i) is a vector of ages that represents the current N+1 ages that are actually available. In Table 1, COST(i) is the distance, as described above, between the ideal age vector and the vector of ages formed by removing the ith age from the N+1 available ages. The objective is to find which of the nowlist(i) ages is least desirable and discard the corresponding file. The vector of ages obtained from nowlist(i) by eliminating the Xth entry has a distance, COST, from the ideal age vector, where the distance is defined as described in paragraph 12. The overall objective is to make the elimination choices such that averaged over time, COST is minimized. The algorithms shown in Tables 1-4 are for illustrative purposes only; any appropriate algorithm may be used in various embodiments. For example, if the aging rate is liable to be changing (e.g., fewer code changes are being made over time, so that the differences in age of the incoming files become smaller), a rescaling provision may be included.

TABLE 1

Greedy Algorithm (try all the possibilities, choose least cost)

```
MINCOST = some big number
for i=N+1 to 1 step −1
    if COST(i) < MINCOST then
        X = i
        MINCOST = COST(i)
    End
End
```

TABLE 2

FROMLAST Algorithm (Fill in slots from the end, looking for the extra)

```
found=no
for i=N to 1 step −1 while found=no
    j=i+1
    X = j
    if nowlist(j) > alist(i) then found=yes
end
```

TABLE 3

RANGE Algorithm (adjusts to midpoints between alist( ) values)

```
for i=1 to N−1
    b(i) = (alist(i) + alist(i+1))/2
end
found = no
b(N) = alist(N) + (alist(N) − alist(N−1))/2
for i=N to 1 step −1 while found=no
    j=i+1
```

TABLE 3-continued

RANGE Algorithm (adjusts to midpoints between alist( ) values)

```
    X=j
    if nowlist(j) > b(i) then found=yes
end
```

TABLE 4

FROMLAST2 Algorithm (considers last 2 files instead of just last one)

```
found=no
for i=N to 2 step −1 while found=no
    j=i+1
    X = j
    if( (nowlist(j) < alist(i)) & (nowlist(j−1) > alist(i−1)) ) then found=yes
end
if (found=no) then X=2
```

In some embodiments, more than one new version file may be become available simultaneously. In some embodiments, the multiple new files may be dealt with one at a time to determine what files to delete to make room for the new files, using any of the methods algorithms discussed above. In other embodiments, a variation of the Greedy Algorithm of Table 1 may be implemented, where for the case of M new version files, each of the (N+M)!/(N!M!) subsets of size N of the N+M available ages is used to form a proposed age vector, the COST of that vector determined, and the vector of minimum COST thus determined. The version files corresponding to those ages are retained, and the other M version files deleted.

FIG. 4 illustrates an example of a computer 400 which may be utilized in conjunction with embodiments of ideal age vector based file retention. Various operations discussed above may utilize the capabilities of the computer 400. One or more of the capabilities of the computer 400 may be incorporated in any element, module, application, and/or component discussed herein. For example, the existing files may be stored in memory 420, and the size of memory 420 may give the number N of files to be retained.

The computer 400 includes, but is not limited to, PCs, workstations, laptops, PDAs, palm devices, servers, storages, and the like. Generally, in terms of hardware architecture, the computer 400 may include one or more processors 410, memory 420, and one or more I/O devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a digital signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 460 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include retaining files in a software testing system such that the age of identified bugs may be determined.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for improving a software testing system of a software product by improving an ability to detect software bug origins in the software product when a storage of a plurality of version files of the software product is exceeded, the computer program product comprising:
   a computer readable storage medium having program instructions embodied therewith, the program instructions readable by a processing circuit to cause the processing circuit to perform a method comprising:
   determining, by the processing circuit, a likelihood that a newly-detected bug is of a given age using a probability distribution function;
   determining, by the processing circuit, an age vector of historical bug age data corresponding to the software product in the software testing system, wherein the software testing system stores the plurality of version files of the software product in the storage of a memory, wherein the age vector is based on an amount of times bugs have been historically in the same software product, the likelihood that the newly-detected bug is of the given age, and a maximum number 'N' of the plurality of version files to retain in the storage of the memory without exceeding the storage of the memory;
   based on receiving a new version file of the software product that will exceed the storage of the memory, determining, by the processing circuit, a version file of the same software product to delete of the plurality of version files and the new version file based on the age vector such that the determining the version file of the same software product to delete is based on the amount of times bugs have been historically in the same software product, thereby improving the ability to detect software bug origins in the same software product without exceeding the storage of the memory; and
   deleting, by the processing circuit, the determined version file of the same software product to delete such that a number of remaining version files is equal to a number of the plurality of version files without exceeding the storage of the memory, thereby ensuring a capability to identify the software bug origins in the remaining version files without exceeding the storage of the memory and without deletion of any of the remaining version files.

2. The computer program product of claim 1, wherein the age vector is associated with the probability distribution function of historical bug age data.

3. The computer program product of claim 1, wherein determining the version file to delete of the plurality of version files and the new version file based on the probability distribution function comprises:
   for each of a plurality of deletion candidate version files, determining an actual age vector for remaining version files without the deletion candidate;
   determining an actual age vector having a smallest distance from the age vector; and
   selecting the deletion candidate version file corresponding to the actual age vector having the smallest distance from the age vector as the file to delete;
   wherein a respective actual age vector is determined using each of the new version file and the plurality of version files as the deletion candidate.

4. The computer program product of claim 3, wherein the distance is determined based on an absolute value of a difference between the actual age vector components and the age vector components.

5. The computer program product of claim 3, wherein the distance is determined based on a component-wise nearest neighbor distance.

6. The computer program product of claim 3, wherein the distance is determined based on a Euclidean distance.

7. A computer system for improving a software testing system of a software product by improving an ability to detect software bug origins in the software product when a storage of a plurality of version files of the software product is exceeded, the system comprising:
   a memory; and
   a processor, communicatively coupled to said memory, the computer system configured to perform a method comprising:
   determining, by the processor, a likelihood that a newly-detected bug is of a given age using a probability distribution function;
   determining, by the processor, an age vector of historical bug age data corresponding to the software product in the software testing system, wherein the software testing system stores the plurality of version files of the software product in the storage of the memory, wherein the age vector is based on an amount of times bugs have been historically in the same software product, the likelihood that the newly-detected bug is of the given age, and a maximum number 'N' of the plurality of version files to retain in the storage of the memory without exceeding the storage of the memory;
   based on receiving a new version file of the software product that will exceed the storage of the memory, determining, by the processor, a version file of the same software product to delete of the plurality of version files and the new version file based on the age vector such that the determining the version file of the same software product to delete is based on the amount of times bugs have been historically in the same software product, thereby improving the ability to detect software bug origins in the same software product without exceeding the storage of the memory; and
   deleting, by the processor, the determined version file of the same software product to delete such that a number of remaining version files is equal to a number of the plurality of version files without exceeding the storage of the memory, thereby ensuring a capability to identify the software bug origins in the remaining version files without exceeding the storage of the memory and without deletion of any of the remaining version files.

8. The system of claim 7, further comprising determining the age vector based on a probability distribution function of historical bug age data.

9. The system of claim 7, wherein determining the version file to delete of the plurality of version files and the new version file based on the probability distribution function comprises:
   for each of a plurality of deletion candidate version files, determining an actual age vector for remaining version files without the deletion candidate;
   determining an actual age vector having a smallest distance from the age vector; and
   selecting the deletion candidate version file corresponding to the actual age vector having the smallest distance from the age vector as the file to delete;
   wherein a respective actual age vector is determined using each of the new version file and the plurality of version files as the deletion candidate.

10. The system of claim 9, wherein the distance is determined based on an absolute value of a difference between the actual age vector components and the age vector components.

11. The system of claim 9, wherein the distance is determined based on a component-wise nearest neighbor distance.

12. The system of claim 9, wherein the distance is determined based on a Euclidean distance.

* * * * *